United States Patent [19]

Walker

[11] Patent Number: 4,771,678
[45] Date of Patent: Sep. 20, 1988

[54] PISTON LOCKING DEVICE FOR DOUBLE ACTING HYDRAULIC CYLINDER

[75] Inventor: Jimmie K. Walker, Sioux City, Iowa

[73] Assignee: Prince Manufacturing Corporation, Sioux City, Iowa

[21] Appl. No.: 123,804

[22] Filed: Nov. 23, 1987

Related U.S. Application Data

[63] Continuation of Ser. No. 871,862, Jun. 9, 1986, abandoned.

[51] Int. Cl.⁴ ............................................. F01B 29/00
[52] U.S. Cl. ...................................... 92/128; 92/166; 92/256; 403/377
[58] Field of Search ................. 92/166, 255, 256, 128; 285/305; 403/355, 377

[56] References Cited

U.S. PATENT DOCUMENTS

| | | | |
|---|---|---|---|
| 1,937,502 | 12/1933 | Anger | 403/355 |
| 2,386,834 | 10/1945 | Barnum | 287/119 |
| 2,458,714 | 1/1949 | Mahoney | 403/377 |
| 2,531,907 | 11/1950 | Daubenmeyer | 92/29 |
| 2,574,299 | 11/1951 | Sterrett | 92/166 |
| 2,665,931 | 1/1954 | Vegren | 403/355 |
| 2,890,073 | 6/1959 | Thomas | 403/377 |
| 3,065,005 | 11/1962 | Hall, Sr. | 287/52 |
| 3,282,167 | 11/1966 | McKenzie | 92/166 |
| 3,422,630 | 1/1969 | Marier | 403/355 |
| 3,648,348 | 3/1972 | Freimuth | 403/377 |
| 3,708,188 | 1/1973 | Flick | 403/355 |
| 3,807,285 | 4/1974 | Phillips | 92/255 |
| 4,069,747 | 1/1978 | Forry | 92/166 |
| 4,094,231 | 6/1978 | Carr | 92/128 |
| 4,357,858 | 11/1982 | Wedman | 285/305 |
| 4,564,088 | 1/1986 | Takahashi | 92/29 |

FOREIGN PATENT DOCUMENTS 838670 5/1952 Fed. Rep. of Germany ...... 403/377

*Primary Examiner*—Abraham Hershkovitz
*Attorney, Agent, or Firm*—Zarley, McKee, Thomte, Voorhees & Sease

[57] ABSTRACT

The double acting hydraulic piston and cylinder assembly of the present invention utilizes a unique fastening mechanism for fastening the piston to the cylinder rod. The piston has a rod receiving opening through which the piston rod is fitted. The piston includes a piston groove which is aligned with an annular rod groove in the outer surface of the rod. Extending from the outer circumference of the piston inwardly to the piston groove is an access opening, through which a retaining wire is inserted. The retaining wire is wrapped around the piston rod and fits within both the piston groove and the rod groove so as to hold the piston against longitudinal movement with respect to the rod.

The method of the present invention comprises inserting the retainer wire through the access opening in the piston and rotating the piston until the wire wraps around the piston rod.

2 Claims, 1 Drawing Sheet

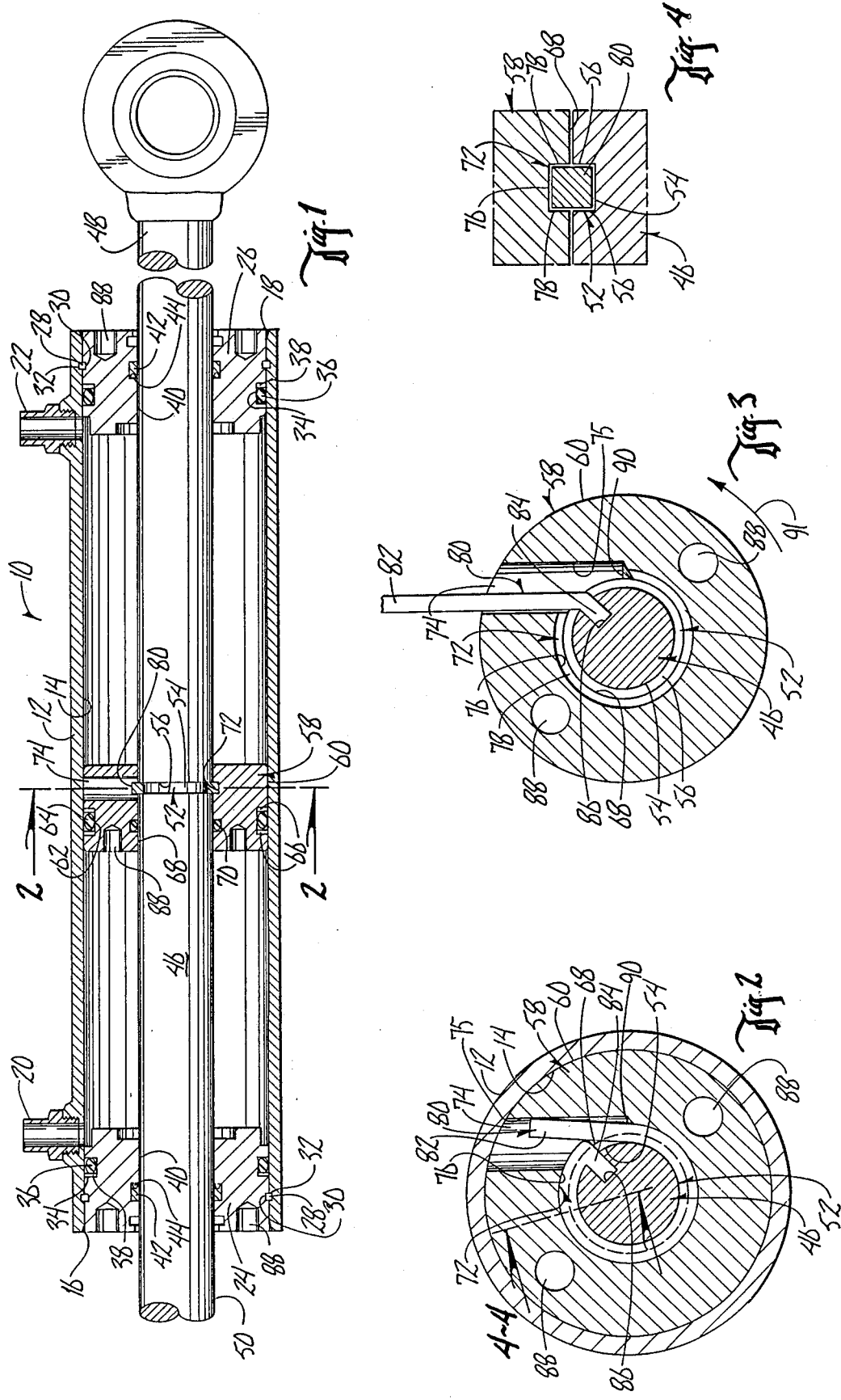

PISTON LOCKING DEVICE FOR DOUBLE ACTING HYDRAULIC CYLINDER

This is a continuation of copending application Ser. No. 871,862 filed on June 9, 1986, now abandoned.

BACKGROUND OF THE INVENTION

The present invention relates to a double acting hydraulic piston and cylinder assembly and a method for assembling the same.

Double acting, double ended cylinders include a piston rod which extends from both ends of the cylinder. The piston operates in both directions by introducing fluid under pressure alternatively to opposite sides of the piston.

In the past, pistons for such double ended cylinders have been fastened to the rod by several different methods. One method comprises threading a two piece rod together within the piston so that the rod extends from opposite ends of the piston. Another method involves welding the piston in place on the rod. A third method involves installing collars on both sides of the piston for holding the piston against axial movement on the rod. A fourth method involves pinning the piston to the rod. Therefore, a primary object of the present invention is the provision of an improved double acting hydraulic piston and cylinder assembly and an improved method for assembling same.

A further object of the present invention is the provision of means for securing the piston to the rod which eliminates the disadvantage of distortion of the rod which occurs in the present method of welding the piston to the rod.

A further object of the present invention is the provision of a device for attaching the piston to the rod so that the piston can be fitted loosely over the rod and then attached securely in place.

A further object of the present invention is the provision of a means for holding the piston positively in place once it is installed so that it will not move in either direction axially on the rod.

A further object of the present invention is the provision of a device which may be disassembled easily for removing the piston and for repacking or rebuilding the cylinder and piston assembly.

A further object of the present invention is the provision of an improved hydraulic piston and cylinder assembly wherein the piston rod is straight and completely concentric since there is only one part to the piston rod rather than the prior method of threading two piston rod segments into the piston.

A further object of the present invention is the provision of a hydraulic piston and cylinder assembly which has interchangeable parts adapted to high production techniques.

SUMMARY OF THE INVENTION

The present invention contemplates the use of a retaining wire which fits within complementary grooves on the inner diameter of the piston and on the outer diameter of the piston rod. The two grooves are aligned, and the retaining wire is fitted within the two aligned grooves so as to hold the piston against axial movement with respect to the rod.

The method for installing the wire includes inserting the wire through an access opening in the piston. The access opening extends from the outer diameter of the piston to the inner diameter of the piston and the access opening is in communication with the piston groove.

The access wire has a small hook on one end, and this hook is received within a radial bore located in the piston rod in the bottom wall of the piston rod groove.

The wire is inserted into the access opening of the piston, and the hook portion of the wire is inserted into the radial bore in the piston rod. A pair of spanner wrench holes are provided in the piston for receiving a spanner wrench so as to permit rotation of the piston with respect to the piston rod. As the piston is rotated, the wire is wound around the piston rod until it surrounds the piston rod and fits within both the piston rod groove and the piston groove. In this position the retaining wire holds the piston rod against axial movement with respect to the piston.

To remove the device, one need merely use the spanner wrench to rotate the piston in the opposite direction from which it was originally rotated to insert the wire. Rotation of this piston causes the wire to unwind from around the piston rod and to move radially outwardly through the access opening in the piston so that it can be removed.

BRIEF DESCRIPTION OF THE FIGURES OF THE DRAWINGS

FIG. 1 is a longitudinal sectional view taken through the double acting hydraulic piston and cylinder assembly of the present invention.

FIG. 2 is a sectional view taken along line 2—2 of FIG. 1.

FIG. 3 is a view similar to FIG. 2, but showing the position of the retaining wire prior to the time that it is wrapped around the piston rod.

FIG. 4 is an enlarged sectional view taken along line 4—4 of FIG. 2.

DETAILED DESCRIPTION OF THE PREFERRED EMBODIMENT

Referring to the drawings, the numeral 10 generally designates the double acting hydraulic piston and cylinder assembly of the present invention. Assembly 10 comprises a cylinder 12 having a cylindrical bore 14 extending axially therethrough. The opposite ends of cylinder 12 include chamfered edges 16, 18 which are provided to minimize damage to the piston, cylinder glands, and the various O-ring seals of those components during their insertion into bore 14.

A pair of fitting openings 20, 22 are provided in cylinder 12 and are normally fitted with plugs during shipping. These openings 20, 22, however, are used to threadably receive fittings for connecting hydraulic hose to the cylinder.

Cylinder 12 includes a pair of glands 24, 26 which fit within the opposite ends of cylinder 12 and which provide a closure for the opposite ends of cylinder 12. Glands 24, 26 are identical in construction, and therefore corresponding numerals are used to identify similar parts. Glands 24, 26 are held in position in the opposite ends of piston 12 by means of retaining wires 28 which surround glands 24, 26 and which fit within an annular groove 30 which also surrounds glands 24, 26. A complementary groove 32 is also provided in the inner cylindrical bore 14 of cylinder 12, and also receives the retaining wire 28 so as to hold the glands 24, 26 against axial movement within cylinder 12. Glands 24, 26 also include a sealing ring groove 34 having a sealing ring 36 and a back-up seal 38 therein.

Extending centrally through each of glands 34, 36 is a rod receiving opening 40 having a conventional urethane U-cap 42 and O-ring 44 therein.

Slidably extending through rod opening 40 is an elongated piston rod 46 which has opposite ends 48, 50 extending outwardly therefrom. Intermediate the opposite ends of rod 46 is an annular rod groove 52 having a bottom wall 54 and opposite side walls 56 (FIG. 4).

A hydraulic piston 58 includes an outer cylindrical surface 60 which slidably fits within bore 14 of cylinder 12. The outer surface 60 is also provided with a sealing groove 62 having a sealing ring 64 and back-up seals 66 therein.

Piston 58 also includes a rod receiving opening 68 which slidably fits over rod 46 and which includes an O-ring groove and seal 70. Piston 58 also includes an annular piston groove 72 which is in registered alignment with the rod groove 54. Extending outwardly from piston groove 72 is an access opening 74 which has an inner end in communication with piston groove 72 and which has its outer end extending outwardly through the outer piston surface 60. Thus, access opening 74 extends from the outer surface 60 inwardly into communication with grooves 72 and also into communication with the rod receiving opening 68 of piston 58. As can be seen in FIGS. 2 and 3, the access opening 74 includes one of its walls 75, having its lower end approximately tangentially positioned with respect to the annular piston groove 72. This is an important feature inasmuch as it enables the retaining wire to be easily wrapped around the piston rod 46 as will be described more fully hereafter.

As can be seen in FIG. 4, piston groove 72 includes an outer annular wall 76 and two side walls 78.

A retaining wire 80 is shown in FIG. 2 to be wound around piston rod 46. Retaining wire 80 includes a first end 82 and a second end 84 which is bent at an angle with respect to the retaining wire to form a hook portion. Hook portion 84 is fitted within a radial bore 86 which is located within rod groove 52. This insertion of hook portion 84 into radial bore 86 causes the retaining wire 80 to be retentively engaged by the piston rod 46 during rotation of the piston 58. As can be seen in FIG. 4, retaining wire 80 fits within both of the rod groove 52 and the piston groove 72 so as to limit axial movement of the piston 58 with respect to rod 46.

FIG. 3 illustrates the position of the retaining wire 80 immediately prior to the time that it is inserted into the annular grooves 52, 72. The wire is inserted downwardly through access opening 74 and is inserted into radial bore 86 of piston rod 46. A pair of spanner wrench holes 88 are shown in one of the axial faces of piston 58, and these spanner wrench holes are gripped by a spanner wrench (not shown), so as to facilitate rotation of the piston 58 with respect to piston rod 46. This causes the hook-like portion 84 and the radial bore 86 to move towards the tangential point 90 between access opening 74 and piston groove 72. The tangential relationship between access opening 74 and annular groove 72 enables the continued rotational movement of the piston in the counterclockwise direction indicated by arrow 91, and this results in the retainer wire 80 being wrapped around the piston rod 46 as continued rotation of the piston with respect to the rod progresses. FIG. 2 illustrates the final position of the retaining wire after the piston has been rotated approximately 360°. Considerable difficulty would be encountered in attempting to wrap the retaining wire 80 around the piston rod in the manner described above if it were not for the tangential relationship of the access opening 74 to the piston groove 72.

During operation of the piston and cylinder assembly, considerable stress is placed upon retaining wire 80 as a result of the axial shear forces which are applied to wire 80 during reciprocating movement of the piston within the cylinder. In order to increase the resistance of this retaining wire to shear forces, various shapes of the retaining wire may be used. A wire square in cross-section may be used, but wires which are round in cross-section or which are rectangular in cross-section can also be used. The rectangular configuration enables the wire to be positioned in such a manner that the longest dimension of the cross-sectional rectangle extends in an axial direction. This provides the greatest resistance of the wire to axial shear forces. The rectangular configuration may be particularly valuable in small hydraulic cylinders where the diameter of the piston rod is relatively small. By using a rectangular retaining wire, it is possible to utilize a shallow piston groove so as to minimize the weakening of the piston rod caused by forming a groove therein.

The piston may be removed from the piston rod by rotating the piston with respect to the rod in a direction opposite from the arrows shown in FIG. 3. This causes the retaining wire 80 to unwrap from around the piston rod 46 so that it moves from the position shown in FIG. 2 to the position shown in FIG. 3. When the retaining wire 80 is in the position shown in FIG. 3, it can be removed by pulling the wire out of the radial bore 86 and removing it from access opening 74. This enables removal or replacement of the piston rod 46 or the piston 58.

The present invention provides an improvement over the prior method of using a two piece rod threaded together under the piston because it requires only a single rod to be formed, and permits the rod to be kept in a true straight configuration. The present invention also provides an improvement over the prior method of welding the piston in place because distortion and bending of the rod and the piston can occur during the welding process. Thus, the parts with the present invention, since no welding is required, can be manufactured to closer tolerances and maintained in closer tolerances without being distorted during the welding process.

The present invention holds the piston positively in place once the wire is installed, and the piston, once installed, will not move axially upon the rod during reciprocating movement of the piston.

The present invention also provides an improvement in that it is easy to assemble or disassemble for packing, rebuilding or repairing. The piston rod is straight and completely concentric since there is only one part. The present invention also provides the advantage that the parts are interchangeable and adapted to high production manufacturing techniques.

Thus it can be seen that the device accomplishes at least all its stated objectives.

What is claimed is:

1. A double acting hydraulic piston cylinder assembly comprising:
   an elongated cylinder having a cylindrical wall, first and second opposite cylinder ends, and a cylindrical bore extending longitudinally therethrough;
   first and second cylinder closure means sealingly fitted within said first and second cylinder ends and each having a rod receiving opening extending therethrough in an axial direction with respect to said cylinder;

an elongated piston rod extending through said rod receiving openings of both of said first and second closure means and having first and second opposite rod ends protruding axially beyond said opposite ends of said cylinder, said rod being longitudinally slidable within said rod receiving openings for reciprocating longitudinal movement therein;

a piston within said cylinder having an outer cylinder surface in close proximity to said cylindrical wall of said cylinder and having a central axial opening surrounding said piston rod;

sealing means between said outer cylindrical surface of said piston and said cylindrical wall of said cylinder;

said rod having an annular rod groove extending therearound and a radial bore in communication with said rod groove and extending radially inwardly therefrom;

said piston having an annular piston groove formed therein within said central opening, said piston groove being in registered alignment radially outwardly from said rod groove;

said piston having an access opening therein, said access opening commencing at an outer end located at said outer cylindrical surface of said piston and extending inwardly within said piston to an inner end in communication with said registered annular piston and rod grooves said access opening having a tangential wall portion which is in approximate tangential relation to said annular piston groove;

a metal retainer wire having a solid cross-sectional configuration and being within said registered annular piston and rod grooves and extending around said piston rod, said retainer wire having a sufficiently large cross section to extend within both of said piston and rod grooves whereby said retainer wire is in communication with said piston and rod grooves and holds said piston against axial sliding movement with respect to said piston rod;

said retainer wire having first and second ends, said second end extending within said radial bore in said rod, said first end of said retainer wire being positioned within said access opening and engaging said tangential wall portion of said access opening.

2. A method for mounting a piston on a rod, said rod being approximately circular in cross section, said piston having an outer cylindrical surface and a circular central opening sized to fit over said rod for longitudinal and rotational movement thereon, said method comprising:

forming an annular rod groove extending around the circumference of said rod;

forming an annular piston groove in said piston within said circular central opening thereof;

sliding said piston onto said rod with said rod extending through said central opening;

aligning said rod groove and said piston groove with one another so that an annular space is defined therebetween;

inserting a metal retainer wire of solid cross sectional configuration and having first and second ends into an access opening within said piston, said access opening having an outer end at said cylindrical surface of said piston and an inner end in communication with said registered piston and rod grooves, said access opening having a tangential wall portion which is in approximately tangential relation to said annular piston groove;

inserting said first end of said retainer wire into a radial bore in said rod, said bore being located within said rod groove;

rotating said piston with respect to said rod whereby the insertion of said first end of said retaining wire into said bore of said rod causes said retaining wire to be fixed to said rod during said rotation of said piston, thereby causing the first end of said retaining wire to rotate with respect to said piston groove and to draw said retainer wire into said annular space between said registered piston and rod grooves, said retainer wire having sufficient cross sectional size to extend at least partially into both of said rod grooves and said piston groove and to hold said piston against axial movement with respect to said rod;

stopping the rotation of said piston when said second end of said retaining wire is drawn completely into said access opening and is frictionally engaging said tangential wall portion of said access opening for sliding movement thereagainst;

removing said retaining wire by reversing the rotation of said piston relative to said rod whereby said second end of said retaining wire will slide against said tangential wall portion and move outwardly from said access opening.

* * * * *